(12) United States Patent
Kawaura et al.

(10) Patent No.: US 11,851,733 B2
(45) Date of Patent: Dec. 26, 2023

(54) MANUFACTURING METHOD OF POROUS SILICON MATERIAL, POROUS SILICON MATERIAL, AND POWER STORAGE DEVICE

(71) Applicant: TOYOTA JIDOSHA KABUSHIKI KAISHA, Toyota (JP)

(72) Inventors: Hiroyuki Kawaura, Nagakute (JP); Yasuhito Kondo, Nagakute (JP); Ryo Suzuki, Nagakute (JP); Hiroshi Nozaki, Nagakute (JP); Jun Yoshida, Mishima (JP); Tetsuya Waseda, Susono (JP); Mitsutoshi Otaki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/844,175

(22) Filed: Jun. 20, 2022

(65) Prior Publication Data

US 2022/0411897 A1 Dec. 29, 2022

(30) Foreign Application Priority Data

Jun. 22, 2021 (JP) .................. 2021-102903

(51) Int. Cl.
*C22C 1/08* (2006.01)
*H01M 10/0525* (2010.01)
(Continued)

(52) U.S. Cl.
CPC .............. *C22C 1/08* (2013.01); *C22C 1/1094* (2013.01); *C22C 29/18* (2013.01); *H01M 10/0525* (2013.01)

(58) Field of Classification Search
CPC .......... C22C 1/08; C22C 1/1094; C22C 29/18; C22C 21/02; H01M 10/0525; C01B 33/00
See application file for complete search history.

(56) References Cited

U.S. PATENT DOCUMENTS

2004/0214085 A1* 10/2004 Sheem .................. H01M 4/386
429/231.95
2005/0042128 A1* 2/2005 Matsubara ............ H01M 4/386
419/66

(Continued)

FOREIGN PATENT DOCUMENTS

CN 112004777 A 11/2020
JP 2004-214054 A 7/2004
(Continued)

OTHER PUBLICATIONS

PE2E Search Machine Translation of JP 2009032644A (Year: 2023).*

(Continued)

*Primary Examiner* — Alexandra M Moore
(74) *Attorney, Agent, or Firm* — Dinsmore & Shohl LLP

(57) ABSTRACT

The manufacturing method of a porous silicon material of the present disclosure includes a particle forming step of melting a raw material containing Al as a first element in an amount of 50% by mass or more and Si in an amount of 50% by mass or less to obtain a silicon alloy, a pore forming step of removing the first element from the silicon alloy to obtain a porous material, and a heat treatment step of heating the porous material to diffuse elements other than Si to a surface of the porous material.

7 Claims, 8 Drawing Sheets

(51) Int. Cl.
*C22C 1/10* (2023.01)
*C22C 29/18* (2006.01)

(56) References Cited

U.S. PATENT DOCUMENTS

2013/0196158 A1 8/2013 Yoshida et al.
2021/0371288 A1 12/2021 Okada et al.

FOREIGN PATENT DOCUMENTS

| JP | 2009032644 A | * | 2/2009 |
| JP | 2012-082125 A | | 4/2012 |
| JP | 2013-203626 A | | 10/2013 |

OTHER PUBLICATIONS

Hong, Dongki et al., "Cost-effective approach for structural evolution of Si-based muiticomponent for Li-ion battery anodes" Journal of Materials Chemistry A, 2017, 5, (5), 2095-2101, DOI: 10.10391c6ta00889a.

* cited by examiner

SEM

EDAX ion No. 2021-102903 filed on Jun. 22, 2021, incorporated herein by reference in its entirety.

BACKGROUND

1. Technical Field

The present specification discloses a manufacturing method of a porous silicon material, a porous silicon material, and a power storage device.

2. Description of Related Art

Conventionally, as a negative electrode material of silicon, porous silicon has been suggested which is obtained by mixing 70 parts by mass of Si lumps with 30 parts by mass of Al powder, then making the mixture into a molten alloy in an argon atmosphere, making the alloy into particles by a gas atomization method using a helium gas, and then removing Al by using hydrochloric acid (for example, see Japanese Unexamined Patent Application Publication No. 2004-214054 (JP 2004-214054 A)). According to JP 2004-214054 A, the porous silicon makes it possible to completely suppress micronization resulting from the volumetric expansion and contraction of an active material during charge and discharge, peeling of the active material from a current collector, and lack of contact with a conductive material. As a manufacturing method of a silicon material, a method has been suggested which includes separating a Si alloy composed of Si and an intermediate alloy element including Mg, Co, Cr, Cu, Fe, or the like into Si fine particles and a second phase formed by the substitution of the intermediate alloy element with a molten element in a molten metal containing a predetermined molten element and removing the second phase to obtain a porous silicon material (for example, see Japanese Unexamined Patent Application Publication No. 2012-82125 (JP 2012-82125 A)). According to JP 2012-82125 A, with the porous silicon material, a high capacity and high cycle characteristics can be obtained.

SUMMARY

However, using an alloy having a Si content of 50% by mass or more, the manufacturing method in JP 2004-214054 A is not effective enough to reduce the problem resulting from the expansion and contraction of Si. In the manufacturing method of a porous silicon material in JP 2012-82125 A, the silicon alloy containing the intermediate alloy element needs to be melted and substituted in a molten metal containing a predetermined molten element, that is, the silicon alloy needs to be treated at a high temperature, which necessitates a simple manufacturing process.

The present disclosure has been made in consideration of the above problems, and the main object of the present disclosure is to provide a manufacturing method of a porous silicon material that can further improve electrochemical characteristics, a porous silicon material, and a power storage device.

As a result of carrying out intensive studies to achieve the aforementioned object, the inventors of the present disclosure have found that preparing a silicon alloy containing Al at a mixing ratio close to that in a eutectic composition, removing Al, and performing a heating treatment enables Al present as a solid solution in silicon to diffuse to the surface of the alloy, which makes it possible to obtain a porous silicon material that can further improve electrochemical characteristics. Based on the finding, the inventors have accomplished the manufacturing method of a porous silicon material, the porous silicon material, and the power storage device of the present disclosure.

That is, the manufacturing method of a porous silicon material of the present disclosure includes a particle forming step of making a silicon alloy that contains Al as a first element in an amount of 50% by mass or more and Si in an amount of 50% by mass or less into particles, a pore forming step of removing the first element from the silicon alloy to obtain a porous material, and a heat treatment step of heating the porous material to diffuse elements other than Si to a surface of the porous material.

The porous silicon material of the present disclosure contains skeletal silicon with a three-dimensional network structure having voids that is formed of silicon having a lattice constant of 5.435 Å or less, in which an average porosity of the porous silicon material is in a range of 50% by volume or more and 95% by volume or less, a proportion of Si contained in the porous silicon material as an element excluding oxygen is 85% by mass or more, a proportion of Al contained in the porous silicon material as a first element is in a range of 15% by mass or less, and Al is present on a surface of the porous silicon material.

The power storage device of the present disclosure includes a positive electrode that contains a positive electrode active material, a negative electrode that contains the aforementioned porous silicon material as a negative electrode active material, and an ion conducting medium that is interposed between the positive electrode and the negative electrode and conducts carrier ions.

The present disclosure can further improve the electrochemical characteristics of materials containing Si. The reason why such an effect is obtained is presumed as follows. For example, in a lithium ion secondary battery, a silicon electrode has a theoretical capacity of 4,199 mAh/g, which is about 10 times higher than theoretical capacity, 372 mAh/g, of general graphite. Therefore, the silicon electrode is expected to further increase capacity and energy density. Meanwhile, silicon having absorbed lithium ions is $Li_{4.4}Si$, which has a volume having expanded about 4 times the volume of silicon not yet absorbing lithium. According to the present disclosure, a substance other than silicon that is mainly Al and incorporated into a silicon alloy is selectively removed by being dissolved, which makes it possible to easily produce a porous silicon material having a small pore size and a high porosity. When the porous silicon material having a small pore size and a high porosity is used in a power storage device, such as a lithium ion secondary battery, the expansion and contraction of volume are significantly mitigated. Accordingly, for example, charge and discharge characteristics, such as charge and discharge cycle characteristics, can be improved, which makes it possible to easily obtain a high-performance power storage device. In the porous silicon material, other elements, such as Al, are diffused on the surface. Therefore, the porous silicon material has a purer silicon skeleton, which can further improve electrochemical characteristics, such as charge and discharge capacities.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION

Manufacturing Method of Porous Silicon Material

The manufacturing method of a porous silicon material of the present disclosure includes a particle forming step, a pore forming step, and a heat treatment step. In the particle forming step, a treatment of making a silicon alloy containing Al as a first element and Si into particles is performed. In the pore forming step, a treatment of removing the first element from the silicon alloy to obtain a porous material is performed. In the heat treatment step, a treatment of heating the porous material to diffuse elements other than Si to a surface of the porous material is performed.

Particle Forming Step

Figure 1:
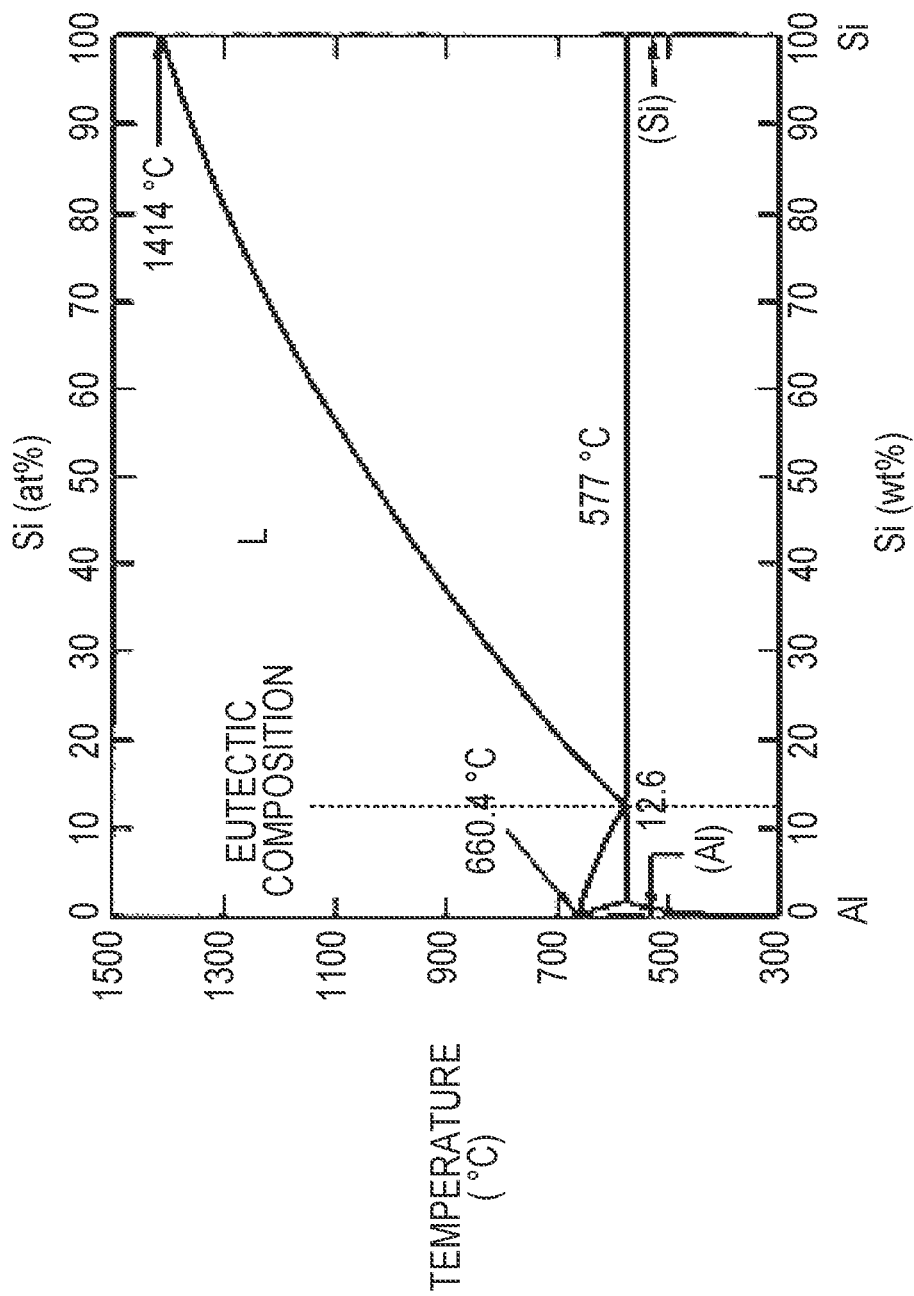
FIG. 1 is an Al—Si binary phase diagram.

In the particle forming step, a silicon alloy is used in which the content of the first element is in a range of 50% by mass or more and the content of Si is in a range of 50% by mass or less. Examples of the first element include Al. Examples of raw materials used in the particle forming step include a Si metal and an Al metal. The content of the first element in the silicon alloy used in the particle forming step is, in embodiments, in a range of 60% by mass or more and, in some embodiments, in a range of 70% by mass or more, or may be in a range of 80% by mass or more. The content of the first element in the silicon alloy used in the particle forming step is, in embodiments, in a range of 92% by mass or less and, in some embodiments, in a range of 90% by mass or less, or may be in a range of 85% by mass or less. The silicon alloy in which the content of the first element is in the range may be used in embodiments because the silicon alloy can further increase porosity and makes it possible to obtain voids having more suitable shape and size. In a case where the content of the first element is 92% by mass or less, the silicon skeleton can be maintained. In a case where the content of the first element is 50% by mass or more, the porosity can be further increased. In a case where the content of Al is high, a single phase of Al is precipitated much after the silicon alloy is made into an alloy by melting and then rapidly cooled. Accordingly, many voids can be formed. In the particle forming step, a silicon alloy in which the content of the first element is in a range capable of forming a eutectic composition may be used. The eutectic composition contains 87.6% by mass of Al and 12.6% by mass of Si. However, the silicon alloy may be close to the eutectic composition, or may cover a predetermined range, such as a part of a hypoeutectic or hypereutectic composition. For example, the silicon alloy may be in a range of ±3% by mass with respect to the eutectic composition. FIG. 1 is an equilibrium phase diagram of an Al—Si binary system.

In the particle forming step, the silicon alloy may be a composition that contains, in addition to the first element and Si, a second element including one or more elements among Ca, Cu, Mg, Na, Sr, and P. Among these, one or more elements among Ca, Na, and Sr may be the second element, in embodiments. The content of the second element is lower than the content of the first element. For example, in the silicon alloy, the content of the second element with respect to the total mass of the silicon alloy is, in embodiments, in a range of 10% by mass or less, and, in embodiments, in a range of 5% by mass or less. The content of the second element may be 0.1% by mass or more.

In the particle forming step, the raw materials may contain unavoidable impurities. The unavoidable impurities are components that inevitably remain in the process of purifying any of Si, Ti, and Al. Examples of the unavoidable impurities include Fe, C, Cu, Ni, and P. In embodiments, the content of the unavoidable impurities may be lower. For example, on the assumption that the total amount of Si and Al is 100 at %, the content of the unavoidable impurities is 5 at % or less, in embodiments, and 2 at % or less, in some embodiments. The raw materials used in the particle forming step may be composed of Si in a predetermined range and Al plus unavoidable impurities as a remainder. The content of Si in a predetermined range may, for example, be in a range of 10 at % or more and 28 at % or less.

The particle forming step may be a step of making the molten silicon alloy into particles by any of a gas atomization method, a water atomization method, and a roll quenching method. The particle forming step may also be a step of casting the molten raw material of the silicon alloy into a mold and crushing the obtained ingot to form particles. Among the above methods, the gas atomization method may be used in embodiments as a method for making the silicon alloy into particles. During gas atomization, the alloy may be melted in an Ar atmosphere, and particles may be formed in an Ar or He atmosphere. In the particle forming step, the silicon alloy may be made into particles having an average particle size in a range of 0.1 μm or more and 100 μm or less. The average particle size of the particles is, for example, 0.5 μm or more and 10 μm or less, in embodiments, 1 μm or more and 5 μm or less, and, in embodiments, 1 μm or more and 3 µm or less. The silicon alloy particles may be appropriately selected depending on the characteristics that the power storage device needs to have. The average particle size of the particles is determined by observing the particles with a scanning electron microscope (SEM), adding up the major diameters of the particles as diameters of the particles, and dividing the result by the number of particles, so that the average particle size is obtained.

Pore Forming Step

In the pore forming step, a treatment of removing substances other than Si from the silicon alloy prepared in the particle forming step is performed. Examples of the substances other than Si include Al as the first element or an Al compound and the second element or a compound of the second element. In the pore forming step, an acid or alkali may be used to selectively remove Al as the first element or an Al compound or remove the second element or a compound of the second element. The acid or alkali to be used may be a substance that elutes elements and/or compounds other than silicon in the silicon alloy but does not elute silicon. Examples of the acid or alkali include hydrochloric acid, sulfuric acid, and sodium hydroxide. The acid or alkali may be an aqueous solution, in embodiments. The concentration of the acid or alkali is not particularly limited as long as Al as the first element or an Al compound and the second element or a compound of the second element can be removed. For example, the concentration of the acid or alkali can be in a range of 1 mol/L or more and 5 mol/L or less. The removal treatment may be performed by heating at, for example, 20° C. to 60° C. In the removal treatment, the silicon alloy particles may be immersed in an acid or alkali solution and the solution may be stirred for about 1 hour to 5 hours. The obtained porous silicon material is then washed and dried.

In the pore forming step, the amount of substances other than Si to be removed may be in a range of 85% by mass or more and 100% by mass or less. For example, it does not matter even though the first or second element and oxygen other than the first and second elements may remain. However, because these are components unnecessary for the porous silicon material, the amount of these be smaller, in embodiments. The pore forming step may also be a step of obtaining a porous silicon material having an average porosity in a range of 50% by volume or more and 95% by volume or less. The average porosity is a value measured by a mercury porosimeter.

Heat Treatment Step

In the heat treatment step, a treatment of heating the porous material obtained by the pore forming step to diffuse elements other than Si to the surface of the porous material is performed. In the heat treatment step, the porous material may be heated at a temperature in a range of 400° C. or higher and 1,100° C. or lower. In this temperature range, at a temperature of 400° C. or higher, Al that is present as a solid solution in the silicon skeleton is precipitated. Presumably, at a temperature of 600° C. or higher, the precipitated Al may diffuse on the surface. In addition, presumably, at a temperature of 800° C. or higher, Al having diffused on the surface of the silicon skeleton may form an oxide and strengthen the silicon skeleton. In embodiments, in the heat treatment step, the first element having diffused on the surface may be oxidized and the surface of the silicon skeleton may be coated with the oxide containing the first element. Coating with the oxide makes it possible to further strengthen the silicon skeleton. The oxide may include an AlSi oxide, an AlFe oxide, a SiFe oxide, an AlSiFe oxide, and the like, in addition to an Al oxide.

In the heat treatment step, the porous material may be heated in a temperature range of 600° C. or higher in an inert atmosphere. In a case where the porous material is heated under this condition, Al is precipitated and diffuses on the surface. At the time, the porous material may be heated in a temperature range of 800° C. or higher in an inert atmosphere. In a case where the porous material is heated under this condition, the surface of the silicon skeleton can be coated with an oxide containing Al. Examples of the inert atmosphere include a nitrogen atmosphere and a noble gas atmosphere. The inert atmosphere is a noble gas atmosphere, in embodiments. Examples of the noble gas include He and Ar. In embodiments, the noble gas may comprise Ar. Alternatively, in the heat treatment step, the porous material may be heated in the presence of oxygen at a temperature in a range of 400° C. or higher. In a case where the porous material is heated under this condition, Al can be precipitated, and an oxide can be produced. "In the presence of oxygen" means mild conditions that do not induce overoxidation of the silicon skeleton. For example, the oxygen content in such conditions may be in a range of 5% by volume or less or 1% by volume or less, or may be 1,000 ppm or less or 100 ppm or less. The heat treatment in the presence of oxygen is, in embodiments, performed at a lower temperature compared to the heat treatment in the inert atmosphere. The temperature is, in embodiments 900° C. or lower and, in embodiments, 700° C. or lower, or may be 600° C. or lower.

Porous Silicon Material

The porous silicon material of the present disclosure is prepared by the aforementioned manufacturing method. The porous silicon material contains skeletal silicon (also called a silicon skeleton) having a three-dimensional network structure having voids that is formed of silicon having a lattice constant of 5.435 Å or less. The average porosity of the porous silicon material is in a range of 50% by volume or more and 95% by volume or less. A proportion of Si contained in the porous silicon material as an element excluding oxygen is 85% by mass or more, a proportion of Al contained in the porous silicon material as a first element is in a range of 15% by mass or less, and Al is present on a surface of the porous silicon material. The skeletal silicon has a lattice constant of 5.435 Å or less, and can be regarded as having no solid solution of Al. In embodiments, the porous silicon material may have a higher average porosity which is, in embodiments, 60% by volume or more, in embodiments, 70% by volume or more, and, in embodiments, 80% by volume or more. Because the silicon skeleton needs to be in the porous silicon material, the average porosity is, in embodiments, 95% by volume or less, in embodiments, 90% by volume or less, and, in embodiments, 86% by volume or less. In the porous silicon material, the pore size of the voids is, in embodiments, in a range of 1 nm or more and 1 µm or less, or may be 10 nm or more, 50 nm or more, or 100 nm or more. The pore size of the voids may be 500 nm or less, 300 nm or less, or 250 nm or less.

The porous silicon material is, in embodiments, in the form of particles having an average particle size of 0.1 µm or more. The average particle size is, in embodiments, 1 µm or more, or may be 5 µm or more. The average particle size of the particles is, in embodiments, 10 µm or less, in embodiments, 5 µm or less, and, in embodiments, 3 µm or less. The proportion of Si contained in the porous silicon material as an element excluding oxygen is 85% by mass or more. In embodiments, the proportion of Si contained in the porous silicon material may be higher. The proportion of Si may be 90% by mass or more, 94% by mass or more, or 96% by mass or more. The Si content represented by the proportion of Si contained in the porous silicon material as an element excluding oxygen may be 98% by mass or less, 97% by mass or less, or 96% by mass or less. In the porous silicon material, the content of Al is in a range of 15% by mass or less. In embodiments, the content of Al may be lower, which is, in embodiments, 10% by mass or less, in embodiments, 6.5% by mass or less, and, in embodiments, 5.0% by mass or less. The content of Al in the porous silicon material may be 0.1% by mass or more, 2% by mass or more, or 3% by mass or more. The porous silicon material may contain, as a second element, one or more elements among Ca, Cu, Mg, Na, Sr, and P in a range of 15% by mass or less. In embodiments, the content of elements other than Si may be lower. The porous silicon material may be composed of Si in a predetermined range and Al plus unavoidable impurities as a remainder. The content of Si in a predetermined range may, for example, be in a range of 85% by mass or more and 99.9% by mass or less.

In the porous silicon material, Al is on the surface of the skeletal silicon. The Al may coat the entire surface of the skeletal silicon, or may coat a part of the surface of the skeletal silicon. The Al on the surface of the skeletal silicon may be metallic or may be an oxide. The oxide may include, for example, an AlSi oxide, an AlFe oxide, a SiFe oxide, and an AlSiFe oxide, in addition to an Al oxide.

Electrode for Power Storage Device

The electrode for the power storage device of the present disclosure includes the aforementioned porous silicon material as an electrode active material. The electrode can be either a positive electrode or a negative electrode based on the potential opposite to the potential of the active material. When lithium is used as a carrier, the electrode is, in embodiments, a negative electrode. The electrode can be used, for example, in a lithium ion secondary battery, a hybrid capacitor, and an air battery. The electrode for the power storage device may be an electrode compressed, so that the average porosity of the porous silicon material falls into a range of 5% by volume or more and 50% by volume or less. The electrode may be compressed when prepared, so that the porosity of the porous silicon material is reduced. Compared to the porous silicon material prepared as a material having a porosity in a range of 5% by volume or more and 50% by volume or less, a porous silicon material that is prepared as a material having a porosity of 50% by volume or more and 95% or less and then compressed, so that the porosity falls into a range of 5% by volume or more and 50% by volume or less exhibits better charge and discharge characteristics due to the shape of voids and the like. For example, when porous silicon particles are used as a negative electrode active material of a lithium ion secondary battery, the smaller the pores, the more uniform the obtained alloy when lithium ions take part in alloying. Therefore, stress concentration is reduced, which makes it possible to prevent the deterioration of the electrode. The average porosity of the compressed porous silicon material may be appropriately adjusted depending on the characteristics that the electrode for the power storage device needs to have. For example, the average porosity of the compressed porous silicon material may be 10% by volume or more or 20% by volume or more. The average porosity of the compressed porous silicon material may be, for example, 40% by volume or less or 30% by volume or less.

The electrode for the power storage device may be an electrode including a current collector and the aforementioned porous silicon material that is formed and fixed on the current collector. The electrode can be prepared by a step of mixing the porous silicon material with a conductive material or a binder and a solvent as needed and making the mixture into a paste or a step of mixing the porous silicon material with a conductive material or a binder as needed and bonding the mixture to a current collector under pressure. In embodiments, the content of the porous silicon material in the electrode may be higher. The content of the porous silicon material in the electrode is, in embodiments, 70% by mass or more, in embodiments, 80% by mass or more, and, in embodiments, 85% by mass or more. The conductive material is not particularly limited as long as it is an electron conducting material that does not adversely affect the battery performance. For example, among graphite such as natural graphite (flaky graphite or scale-like graphite) or artificial graphite, acetylene black, carbon black, Ketjen black, carbon whisker, needle cokes, carbon fiber, and a metal (such as copper, nickel, aluminum, silver, or gold), one kind of material or a mixture of two or more kinds of these materials can be used. The binder is a material that functions to bind active material particles and conductive material particles together. For example, among a fluorine-containing resin, such as polytetrafluoroethylene (PTFE), polyvinylidene fluoride (PVdF), or fluororubber, a thermoplastic resin, such as polypropylene or polyethylene, ethylene propylene diene rubber (EPDM), sulfonated EPDM rubber, and natural butyl rubber (NBR), one kind of material or a mixture of two or more kinds of these materials can be used. It is also possible to use a cellulose-based binder that is an aqueous binder, an aqueous dispersion of styrene-butadiene rubber (SBR), and the like. As the solvent, for example, an organic solvent, such as N-methylpyrrolidone, dimethylformamide, dimethylacetamide, methylethylketone, cyclohexanone, methyl acetate, methyl acrylate, diethylenetriamine, N,N-dimethylaminopropylamine, ethylene oxide, or tetrahydrofuran, can be used. A dispersant, a thickener, or the like may be added to water, and the active material may be made into a slurry by using a latex, such as SBR. Examples of coating methods include roller coating with an applicator roll, screen coating, a doctor blade method, spin coating, and bar coating. Any of these can be used to obtain any thickness and shape. The current collector may be appropriately selected depending on the potential of the active material. For example, in addition to aluminum, titanium, stainless steel, nickel, iron, copper, calcined carbon, a conductive polymer, and conductive glass, for the purpose of improving adhesiveness, conductivity, and oxidation resistance, a current collector prepared by treating the surface of aluminum or copper with carbon, nickel, titanium, or silver can be used. The surface can be oxidized as well. The current collector may be in the form of, for example, a foil, film, sheet, net, punched or expanded material, lath, porous material, foamed material, or material formed of a fiber assembly. The thickness of the current collector to be used is, for example, 1 μm to 500 μm. The amount of active material complex to be formed may be appropriately set depending on the desired performance that the power storage device needs to demonstrate.

In the electrode, as long as a low confining pressure and a capacity retention rate can be simultaneously achieved, the electrode active material may contain active materials other than the porous silicon material, in addition to the porous silicon material. For example, the electrode active material may contain a carbonaceous material or $Li_4Ti_5O_{12}$. Here, from the viewpoint of further increasing the battery capacity, on the assumption that the total amount of the electrode active material is 100% by mass, the proportion of the porous silicon material is, for example, 50% by mass or more and, in embodiments, 90% by mass or more.

Power Storage Device

The power storage device of the present disclosure includes an electrode having the aforementioned porous silicon material. The power storage device may include a positive electrode, a negative electrode, and an ion conducting medium that is interposed between the positive electrode and the negative electrode and conducts carrier ions. The porous silicon material can be used as a negative electrode active material. The power storage device may be any one of a lithium ion secondary battery, a hybrid capacitor, an air battery, and the like. In the positive electrode, as a positive electrode active material, it is possible to use a sulfide containing a transition metal element, an oxide containing lithium and a transition metal element, and the like. Specifically, it is possible to use a transition metal sulfide, such as $TiS_2$, $TiS_3$, $MoS_3$, or $FeS_2$, a lithium-manganese composite oxide represented by a basic composition formula $Li_{(1-x)}MnO_2$ (satisfying 0<x<1 or the like, the same shall applied hereinafter) or $Li_{(1-x)}Mn_2O_4$, a lithium-cobalt composite oxide represented by a basic composition formula $Li_{(1-x)}CoO_2$ or the like, a lithium-nickel composite oxide represented by a basic composition formula $Li_{(1-x)}NiO_2$ or the like, a lithium-nickel-cobalt-manganese composite oxide represented by a basic composition formula $Li_{(1-x)}Ni_aCo_bMn_cO_2$ (a+b+c=1) or the like, a lithium-vanadium composite oxide represented by a basic composition formula $LiV_2O_3$ or the like, a transition metal oxide represented by a basic composition formula $V_2O_5$ or the like, and the like. Among these, a lithium transition metal composite oxide, such as $LiCoO_2$, $LiNiO_2$, $LiMnO_2$, or $Li_{(1-x)}Ni_{1/3}Co_{1/3}Mn_{1/3}O_2$, is used, in embodiments. Note that "basic composition formula" means that the positive electrode active material may also contain other elements, such as Al and Mg. Alternatively, the positive electrode active material may be a carbonaceous material used in a capacitor, a lithium ion capacitor, or the like. Examples of the carbonaceous material include activated carbons, cokes, glassy carbons, graphites, non-graphitizable carbons, pyrolytic carbons, carbon fibers, carbon nanotubes, and polyacenes. Among these, activated carbons having a high specific surface area may be used, in embodiments. The specific surface area of the activated carbon as a carbonaceous material is, in embodiments, 1,000 $m^2/g$ or more, and, in embodiments, 1,500 $m^2/g$ or more. In a case where the specific surface area is 1,000 $m^2/g$ or more, the discharge capacity can be further increased. In view of ease of preparation, the specific surface area of the activated carbon is, in embodiments, 3,000 $m^2/g$ or less, and, in embodiments, 2,000 $m^2/g$ or less. As the conductive material, the binder, the solvent, the current collector, and the like to be used for the positive electrode, those exemplified above regarding the aforementioned electrode can be appropriately used.

As the ion conducting medium, a non-aqueous electrolytic solution containing a supporting salt, a non-aqueous gel electrolytic solution, or the like can be used. Examples of solvents for the non-aqueous electrolytic solution include carbonates, esters, ethers, nitriles, furans, sulfolanes, and dioxolanes. These may be used independently or used by being mixed together. Specifically, examples of the carbonates include cyclic carbonates, such as ethylene carbonate, propylene carbonate, vinylene carbonate, butylene carbonate, and chloroethylene carbonate, chain-like carbonates, such as dimethyl carbonate, ethyl methyl carbonate, diethyl carbonate, ethyl-n-butyl carbonate, methyl-t-butyl carbonate, di-i-propyl carbonate, and t-butyl-i-propyl carbonate, cyclic esters, such as γ-butyl lactone and γ-valerolactone, chain-like esters, such as methyl formate, methyl acetate, ethyl acetate, and methyl butyrate, ethers, such as dimethoxyethane, ethoxymethoxyethane, and diethoxyethane, nitriles, such as acetonitrile and benzonitrile, furans, such as tetrahydrofuran and methyl tetrahydrofuran, sulfolanes, such as sulfolane and tetramethylsulfolane, and dioxolanes, such as 1,3-dioxolane and methyl dioxolane. Among these, a combination of cyclic carbonates and chain-like carbonates may be used, in embodiments. This combination not only makes it possible to obtain excellent cycle characteristics that indicate the characteristics of a battery repeatedly charged and discharged, and also makes it possible to allow the viscosity of the electrolytic solution, the electric capacity of the obtained battery, and the battery output to be balanced. Examples of the supporting salt include $LiPF_6$, $LiBF_4$, $LiAsF_6$, $LiCF_3SO_3$, $LiN(CF_3SO_2)_2$, $LiC(CF_3SO_2)_3$, $LiSbF_6$, $LiSiF_6$, $LiAlF_4$, $LiSCN$, $LiClO_4$, $LiCl$, $LiF$, $LiBr$, $LiI$, and $LiAlCl_4$. In view of electrical characteristics, among the supporting salts, one kind of salt selected from the group consisting of an inorganic salt, such as $LiPF_6$, $LiBF_4$, $LiAsF_6$, or $LiClO_4$, and an organic salt, such as $LiCF_3SO_3$, $LiN(CF_3SO_2)_2$, or $LiC(CF_3SO_2)_3$ may be used, in embodiments, or a combination of two or more kinds of salts selected from the same group may be used, in embodiments. The concentration of the supporting salt in the non-aqueous electrolytic solution is, in embodiments, 0.1 mol/L or more and 5 mol/L or less, and, in embodiments, 0.5 mol/L or more and 2 mol/L or less. In a case where the concentration of the supporting salt dissolved is 0.1 mol/L or more, a sufficient current density can be obtained. In a case where the concentration of the supporting salt dissolved is 5 mol/L or less, the electrolytic solution can be more stabilized. A flame retardant, such as a phosphorus-based flame retardant or a halogen-based flame retardant, may be added to the non-aqueous electrolytic solution.

Instead of the liquid ion conducting medium, a solid ion conductive polymer can be used as the ion conducting medium. As the ion conductive polymer, for example, it is possible to use a polymer gel composed of a polymer, such as acrylonitrile, ethylene oxide, propylene oxide, methyl methacrylate, vinyl acetate, vinylpyrrolidone, or vinylidene fluoride, and a supporting salt. An ion conductive polymer and a non-aqueous electrolytic solution can be used in combination. As the ion conducting medium, in addition to the ion conductive polymer, it is also possible to use an inorganic solid electrolyte, a mixed material of an organic polymer electrolyte and an inorganic solid electrolyte, inorganic solid powder bound by an organic binder, and the like.

The power storage device may include a separator between the negative electrode and the positive electrode. The separator is not particularly limited as long as it has a composition durable in the range of use of the lithium secondary battery. Examples of the separator include a polymeric nonwoven fabric, such as a nonwoven fabric made of polypropylene or a nonwoven fabric made of polyphenylene sulfide, and a thin microporous film of an olefin-based resin, such as polyethylene or polypropylene. Each of these may be used alone, or a plurality of these may be used by being mixed together.

Figure 2:
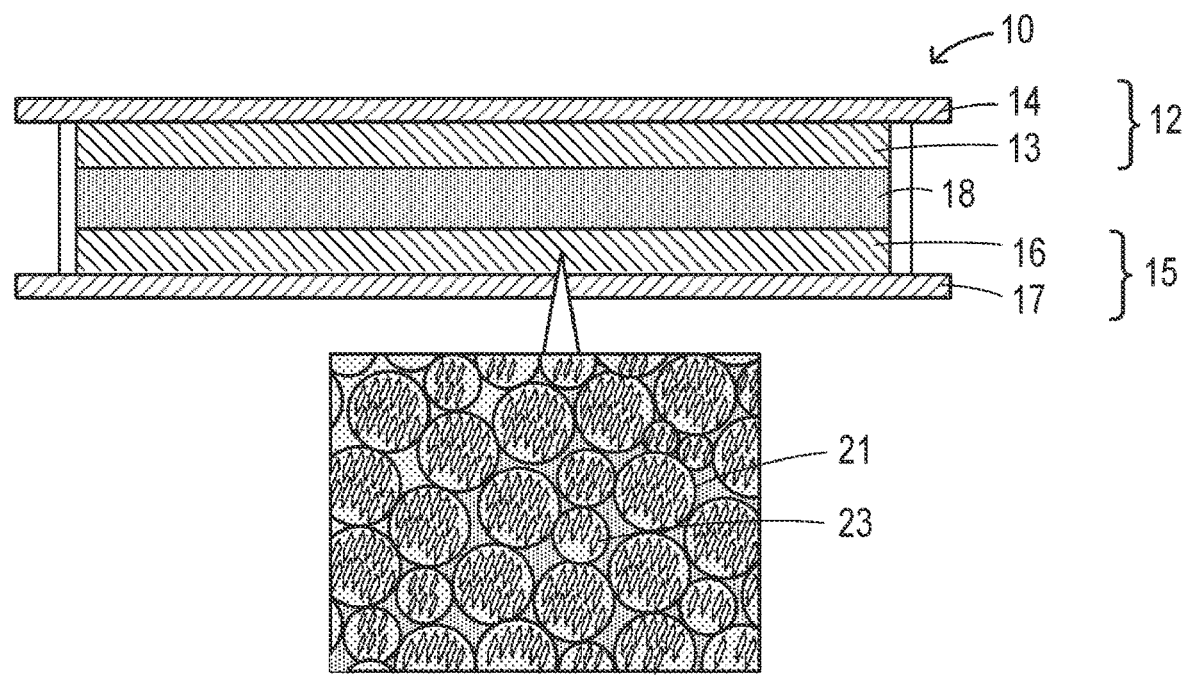
FIG. 2 is a view illustrating an example of the structure of a power storage device 10.

The shape of the power storage device is not particularly limited, and examples thereof include a coin shape, a button shape, a sheet shape, a laminate shape, a cylindrical shape, a flat shape, and an angular shape. The power storage device may be applied to a large-sized power storage device used in a battery electric vehicle or the like. FIG. 2 is a view illustrating an example of the structure of a power storage device 10. The power storage device 10 has a positive electrode 12, a negative electrode 15, and an ion conducting medium 18. The positive electrode 12 has a positive electrode active material 13 and a current collector 14. The negative electrode 15 has a negative electrode active material 16 and a current collector 17. The negative electrode active material 16 is a porous silicon material 21 described above and has voids 23.

All-Solid-State Lithium-Ion Secondary Battery

The power storage device is, in embodiments, an all-solid-state lithium-ion secondary battery. The all-solid-state battery may be selected, in embodiments, because the battery makes it possible to further suppress performance change caused by an electrolytic solution and to further enhance safety. The all-solid-state lithium-ion secondary battery may include a positive electrode containing a positive electrode active material, a negative electrode having the aforementioned porous silicon material as a negative electrode active material, and a solid electrolyte that is interposed between the positive electrode and the negative electrode and conducts lithium ions. As the positive electrode, any of the materials listed above regarding the aforementioned power storage device can be used. As the negative electrode, a negative electrode having the aforementioned porous silicon material can be used.

The solid electrolyte may be, for example, a garnet-type oxide containing at least Li, La, and Zr. The solid electrolyte may have a basic composition represented by $Li_{7.0+x-y}(La_{3-x}, A_x)(Zr_{2-y}, T_y)O_{12}$. Here, A is one or more kinds of elements between Sr and Ca, T is one or more kinds of elements between Nb and Ta, x satisfies $0<x\leq1.0$, and y satisfies $0<y<0.75$. Alternatively, the solid electrolyte may be a garnet-type oxide having a basic composition represented by $(Li_{7-3z+x-y}M_z)(La_{3-x}A_x)(Zr_{2-y}T_y)O_{12}$ or $(Li_{7-3z+x-y}M_z)(La_{3-x}A_x)(Y_{2-y}T_y)O_{12}$. In the formulas, the element M may be one or more elements between Al and Ga, the element A may be one or more elements between Ca and Sr, T may be 1 or more elements between Nb and Ta, z may satisfy $0\leq z\leq0.2$, x may satisfy $0\leq x\leq0.2$, and y may satisfy $0\leq y\leq2$. In the basic composition formula, z satisfies $0.05\leq z\leq0.1$, in embodiments. In the basic composition formula, x satisfies $0.05\leq x\leq0.1$, in embodiments. In the basic composition formula, y satisfies $0.1\leq y\leq0.8$, in embodiments. In a case where each of x, y, and z is in the above range, more suitable ion conductivity can be obtained.

Examples of the solid electrolyte also include $Li_3N$, $Li_{14}Zn(GeO_4)_4$ called LISICON, $Li_{3.25}Ge_{0.25}P_{0.75}S_4$ as a sulfide, $La_{0.5}Li_{0.5}TiO_3$ as a Perobskite-type solid electrolyte, $(La_{2/3}Li_{3x\square1/3-2x})TiO_3$ ($\square$: atomic vacancy), $Li_7La_3Zr_2O_{12}$ as a garnet-type solid electrolyte, $LiTi_2(PO_4)_3$ called NASICON-type solid electrolyte, and $Li_{1.3}M_{0.3}Ti_{1.7}(PO_3)_4$ (M=Sc, Al). Examples of the solid electrolyte also include $Li_7P_3S_{11}$ obtained from glass having a composition of $80Li_2S\cdot20P_2S_5$ (mol %), which is glass ceramics, and $Li_{10}Ge_2PS_2$ as a sulfide-based electrolyte that is a substance having high electric conductivity. Examples of glass-based inorganic solid electrolytes include $Li_2S—SiS_2$, $Li_2S—SiS_2—LiI$, $Li_2S—SiS_2—Li_3PO_4$, $Li_2S—SiS_2—Li_4SiO_4$, $Li_2S—P_2S_5$, $Li_3PO_4—Li_4SiO_4$, $Li_3BO_4—Li_4SiO_4$, and an electrolyte composed of $SiO_2$, $GeO_2$, $B_2O_3$, or $P_2O_5$ as a glass-based substance and $Li_2O$ as a network modifying substance. Examples of thio-LISICON solid electrolytes include a $Li_2S—GeS_2$ system, a $Li_2S—GeS_2—ZnS$ system, a $Li_2S—Ga_2S_2$ system, a $Li_2S—GeS_2—Ga_2S_3$ system, a $Li_2S—GeS_2—P_2S_5$ system, a $Li_2S—GeS_2—SbS_5$ system, a $Li_2S—GeS_2—Al_2S_3$ system, a $Li_2S—SiS_2$ system, a $Li_2S—P_2S_5$ system, a $Li_2S—Al_2S_3$ system, a $LiS—SiS_2—Al_2S_3$ system, and a $Li_2S—SiS_2—P_2S_5$ system. These solid electrolytes may be formed into a plate and disposed between a positive electrode and a negative electrode.

The all-solid-state lithium-ion secondary battery may include a restraining member that restrains a laminate composed of a positive electrode, a solid electrolyte, and a negative electrode laminated on each other in the lamination direction. The restraining member may include, for example, a pair of plate-shaped portions that presses the interposed laminate from both ends of the laminate in the lamination direction, a rod-shaped portion that connects the pair of plate-shaped portions, and an adjusting portion that is connected to the rod-shaped portion and adjusts the space between the pair of plate-shaped portions by a screw structure.

Manufacturing Method of Electrode for Power Storage Device

The manufacturing method of an electrode for a power storage device includes a pressing step of compressing a porous silicon material obtained by the aforementioned manufacturing method of a porous silicon material as an electrode active material, so that the average porosity of the porous silicon material falls into a range of 5% by volume or more and 50% by volume or less. The pressing step makes it possible to reduce porosity while maintaining a suitable pore shape and to further increase energy density. In the pressing step, the porous silicon material may be compressed, so that the average porosity thereof falls into a range of 10% by volume or more or 20% by volume or more, and a range of 40% by volume or less or 30% by volume or less. The average porosity of the compressed porous silicon material may be appropriately adjusted depending on the characteristics that the electrode for the power storage device needs to have. In the pressing step, for example, the electrode may be pressed under a pressure in a range of 2 MPa or more and 20 MPa or less. The pressing step may be a step of performing a treatment of mixing the porous silicon material with a conductive material or a binder and a solvent as needed and making the mixture into a paste or a treatment of mixing the porous silicon material with a conductive material or a binder as needed and bonding the mixture to a current collector under pressure. As for the amount of the porous silicon material to be mixed in and the like, what are described above regarding the electrode for the power storage device can be appropriately employed.

Manufacturing Method of Power Storage Device

The manufacturing method of a power storage device may be a method of using an electrode for a power storage device obtained by the aforementioned manufacturing method of an electrode for a power storage device as a negative electrode, disposing a positive electrode and the negative electrode to make the electrodes face each other, and interposing an ion conducting medium conducting lithium ions between the positive electrode and the negative electrode. A separator may be interposed between the positive electrode and the negative electrode. As the positive electrode, the negative electrode, the ion conducting medium, and the separator, it is possible to appropriately use any of those exemplified above for the aforementioned power storage device.

Manufacturing Method of All-Solid-State Lithium-Ion Secondary Battery

The manufacturing method of an all-solid-state lithium-ion secondary battery includes a laminate preparation step of preparing a laminate composed of a positive electrode, a solid electrolyte conducting lithium ions, and a negative electrode laminated on each other, by using an electrode for a power storage device obtained by the aforementioned manufacturing method of an electrode for a power storage device as a negative electrode. As the positive electrode, the negative electrode, and the solid electrolyte used in the manufacturing method, it is possible to appropriately use any of those exemplified above for the aforementioned all-solid-state lithium-ion secondary battery. The thickness or size of the positive electrode, the negative electrode, and the solid electrolyte used in the manufacturing method can be appropriately selected depending on the desired battery characteristics. In the manufacturing method, the pressing step in the manufacturing method of an electrode for a power storage device may be performed in the laminate preparation step. That is, in the step of pressing the laminate composed of the positive electrode, the solid electrolyte, and the negative electrode laminated on each other, the negative electrode may be pressed as well.

The manufacturing method of an all-solid-state lithium-ion secondary battery may further include a laminate restraining step of restraining the prepared laminate with a restraining member in the lamination direction. The restraining pressure for the laminate is, in embodiments, in a range of, for example, 2 MPa or more and 20 MPa or less.

As being specifically described above, the present disclosure can further improve the electrochemical characteristics of materials containing Si. The reason why such an effect is obtained is presumed as follows. For example, in a lithium ion secondary battery, a silicon electrode has a theoretical capacity of 4,199 mAh/g, which is about 10 times higher than theoretical capacity, 372 mAh/g, of general graphite. Therefore, the silicon electrode is expected to further increase capacity and energy density. Meanwhile, silicon having absorbed lithium ions is $Li_{4.4}Si$, which has a volume having expanded about 4 times the volume of silicon not yet absorbing lithium. According to the present disclosure, a substance other than silicon that is mainly Al and incorporated into a silicon alloy is selectively removed by being dissolved, which makes it possible to easily produce a porous silicon material having a small pore size and a high porosity. When the porous silicon material having a small pore size and a high porosity is used in a power storage device, such as a lithium ion secondary battery, the expansion and contraction of volume are significantly mitigated. Accordingly, for example, charge and discharge characteristics, such as charge and discharge cycle characteristics, can be improved, which makes it possible to easily obtain a high-performance power storage device. In the porous silicon material, other elements, such as Al, are diffused on the surface. Therefore, the porous silicon material has a purer silicon skeleton, which can further improve electrochemical characteristics, such as charge and discharge capacities.

Note that the present disclosure is not limited to the embodiments described above. It goes without saying that the present disclosure can be embodied in various aspects as long as the aspects are within the technical scope of the present disclosure.

Hereinafter, the cases where the porous silicon and the power storage device of the present disclosure are manufactured in specific ways will be described as experimental examples. Experimental Examples 8 to 11 are examples of the present disclosure, Experimental Example 12 is a comparative example, and Experimental Examples 1 to 7 are reference examples. First, a porous silicon material in an Al—Si eutectic composition was examined (Experimental Examples 1 to 7).

Experimental Example 1

Al lumps (87% by mass) having sides of 10 mm and 13% by mass of Si lumps were weighed, mixed together, and dissolved in an Ar inert atmosphere by a high-frequency heating method, thereby obtaining a molten alloy. The molten alloy was subjected to gas atomization using an Ar inert gas, thereby obtaining AlSi alloy powder having an average particle size of 8 µm (particle forming step). The alloy powder was AlSi alloy powder that is an Al—Si eutectic composition (see FIG. 1), and composed of a eutectic Si phase and an Al phase. As a result of analyzing the obtained powder by X-ray diffraction, the presence of an Al phase and a Si phase as crystalline phases was confirmed. Next, the obtained alloy powder was added to 3 mol/L hydrochloric acid diluted with pure water, stirred at room temperature of 25° C. for 1 hour, then filtered while being thoroughly washed, and dried in a vacuum drier at 30° C. for 2 hours (pore forming step). In this way, a porous silicon material of Experimental Example 1 was prepared.

Experimental Example 2

A negative electrode active material of Experimental Example 2 was manufactured in the same manner as in Experimental Example 1, except that the amounts of Al and Si used were changed to 82% by mass and 18% by mass respectively. The alloy powder in Experimental Example 2 was AlSi alloy powder that is an Al—Si hypereutectic composition and composed of primary Si, a eutectic Si phase, and an Al phase. An acid treatment was carried out under the same conditions as in Experimental Example 1, thereby obtaining a negative electrode active material of Experimental Example 2.

Experimental Example 3

A negative electrode active material of Experimental Example 3 was manufactured in the same manner as in Experimental Example 1, except that the amounts of Al and Si used were changed to 73% by mass and 27% by mass respectively. The alloy powder in Experimental Example 2 was AlSi alloy powder that is an Al—Si hypereutectic composition and composed of primary Si, a eutectic Si phase, and an Al phase. An acid treatment was carried out under the same conditions as in Experimental Example 1, thereby obtaining a negative electrode active material of Experimental Example 3.

Experimental Example 4

A negative electrode active material of Experimental Example 4 was manufactured in the same manner as in Experimental Example 1, except that the amounts of Al and Si used were changed to 90% by mass and 10% by mass respectively. The alloy powder in Experimental Example 4 was AlSi alloy powder that is an Al—Si hypoeutectic composition and composed of primary Al, a eutectic Si phase, and an Al phase. An acid treatment was carried out under the same conditions as in Experimental Example 1, thereby obtaining a negative electrode active material of Experimental Example 4.

Experimental Example 5

A negative electrode active material of Experimental Example 5 was manufactured in the same manner as in Experimental Example 1, except that the amounts of Al, Si, and Cu used were changed to 87% by mass, 10% by mass, and 3% by mass respectively. The alloy powder in Experimental Example 5 was AlSiCu alloy powder that is composed of primary Al, a eutectic Si phase, and an $Al_2Cu$ phase. An acid treatment was carried out under the same conditions as in Experimental Example 1, thereby obtaining a negative electrode active material of Experimental Example 5.

Experimental Example 6

A negative electrode active material of Experimental Example 6 was manufactured in the same manner as in Experimental Example 1, except that the amounts of Al and Si used were changed to 43% by mass and 57% by mass respectively. The alloy powder in Experimental Example 2 was AlSi alloy powder that is an Al—Si hypereutectic composition and composed of primary Si, a eutectic Si phase, and an Al phase. An acid treatment was carried out under the same conditions as in Experimental Example 1, thereby obtaining a negative electrode active material of Experimental Example 6.

Experimental Example 7

Si powder having an average particle size of 5 μm was used as a negative electrode active material of Experimental Example 7.

Measurement of Physical Properties of Porous Silicon Material

The porous silicon powder having undergone the acid treatment was dissolved by HF and $HNO_3$, and the amount of Al in porous silicon was measured by ICP optical emission spectroscopy (ICP-OES, PS3520U VDDIIII manufactured by Hitachi High-Tech Science Corporation.). In addition, elemental analysis was performed by observation with a scanning electron microscope (SEM, S-4300 manufactured by Hitachi High-Tech Science Corporation.) and energy dispersive X-ray analysis (EDAX, S-4300 manufactured by Hitachi High-Tech Science Corporation.). The pore distribution was measured with a mercury porosimeter (POWERMASTER60GT manufactured by Quantachrome Instruments).

Results of Physical Property Measurement and Review

Figure 3:
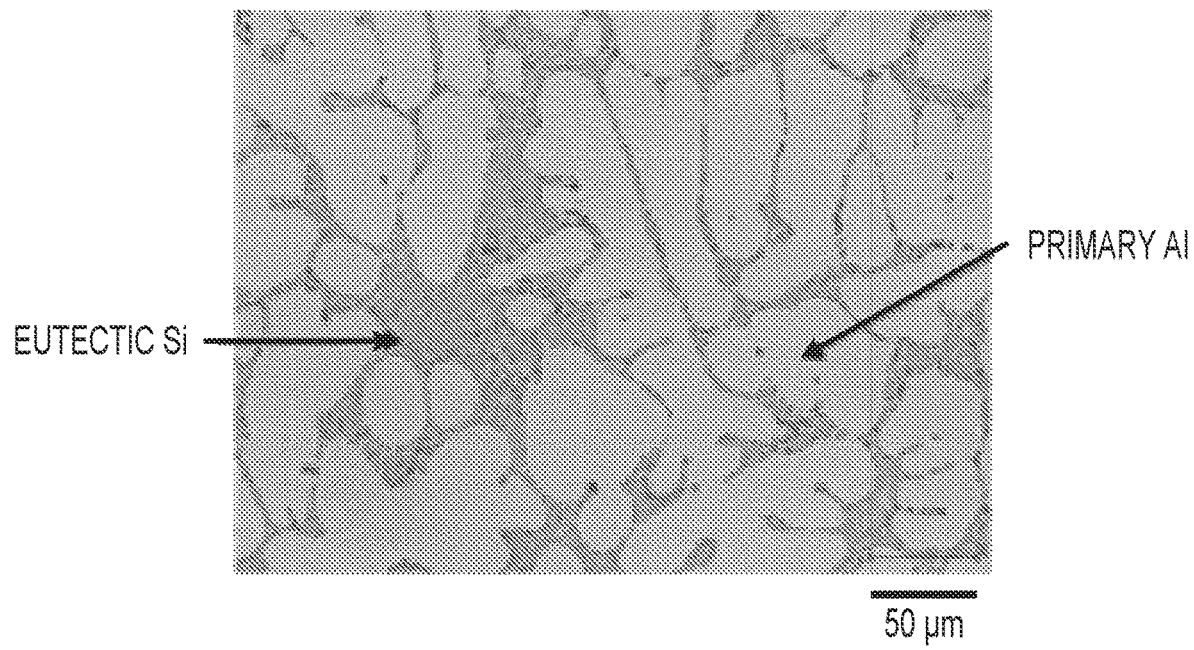
FIG. 3 is an SEM image of an Al—Si alloy observed after gas atomization in Experimental Example 1.
Figure 4B:
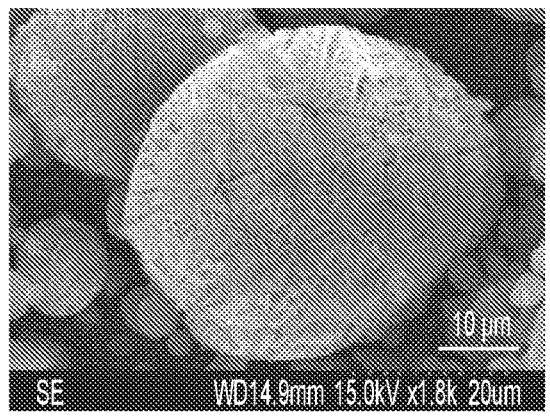
FIG. 4B is an SEM image of the porous silicon material of Experimental Example 1.
Figure 4C:
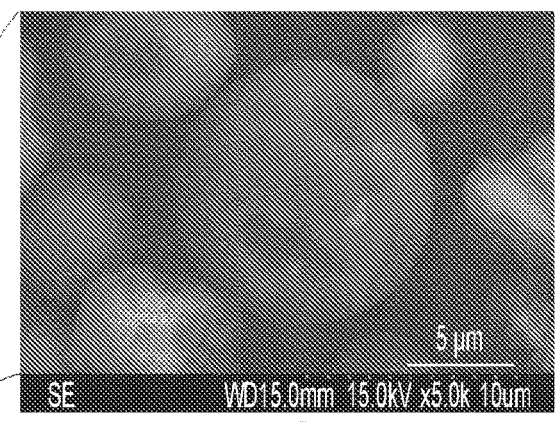
FIG. 4C is an SEM image of the porous silicon material of Experimental Example 1.
Figure 4A:
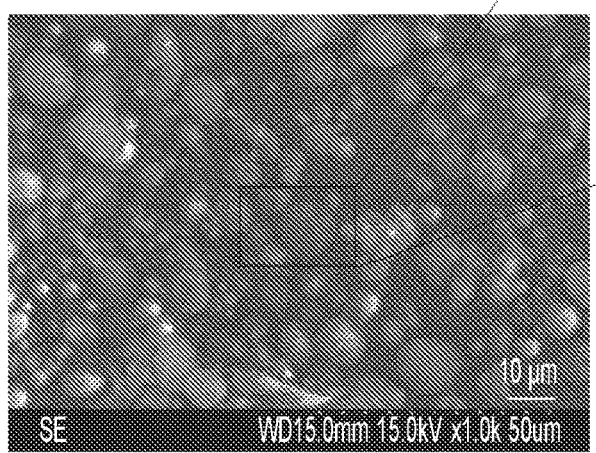
FIG. 4A is an SEM image of a porous silicon material of Experimental Example 1.
Figure 4D:
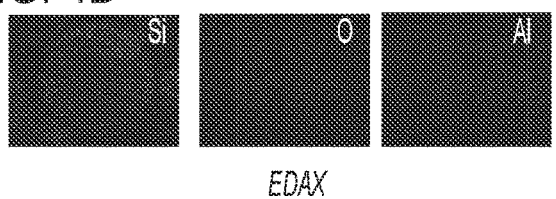
FIG. 4D is an EDAX mapping image of the porous silicon material of Experimental Example 1.
Figure 5:
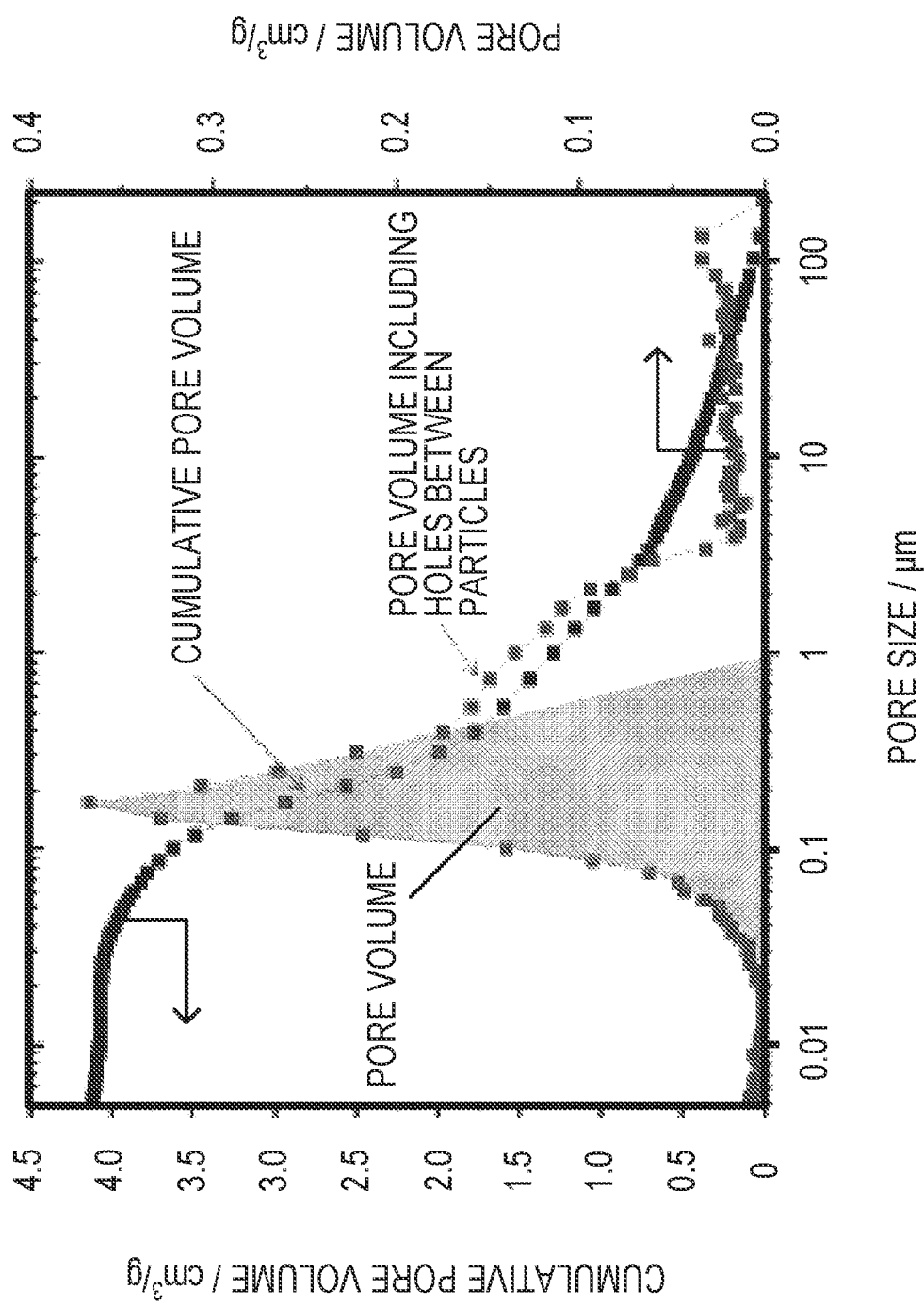
FIG. 5 is a pore distribution curve of the porous silicon material of Experimental Example 1.

FIG. 3 is an SEM image of the Al—Si alloy observed after gas atomization in Experimental Example 1. As shown in FIG. 3, a structure was confirmed in which eutectic Si exists between large primary Al. FIGS. 4A to 4D are SEM images and an EDAX mapping images of the porous silicon material of Experimental Example 1. FIG. 4A is a full image, FIGS. 4B and 4C are enlarged images, and FIG. 4D is an EDAX image. In Experimental Example 1, it was confirmed that Si takes up 13% by mass in the raw material composition and is a structure containing skeletal silicon that maintains a particle shape and has a three-dimensional network structure having voids on the inside of the particle as shown in FIG. 4B. From the EDAX image, it was revealed that the structure is composed of Si, although extremely small amounts of Al and O were detected. It was confirmed that most of the primary Al is removed by the pore forming step as an acid treatment at room temperature. The Al concentration determined by ICP-OES after the pore forming treatment was 4.2% by mass. From the result, it was considered that the composition of the raw material powder tells that most of the aluminum is eluted and porous silicon is formed. FIG. 5 is a pore distribution curve of the porous silicon material of Experimental Example 1. In mercury porosimeter, sometimes the holes between particles are included in the measurement result. Therefore, the alloy particles not yet being subjected to the pore forming treatment and the porous silicon material obtained after the pore forming treatment were measured, and the difference therebetween was adopted as a pore volume. In FIG. 5, the difference is represented by a shaded portion. As shown in FIG. 5, the pore size is 1 μm or less, which is consistent with the size of voids confirmed by the SEM image. As a result of measurement with the mercury porosimeter, it was confirmed that the porous silicon material of Experimental Example 1 has a pore distribution of 50 nm to 500 nm in which a pore size of around 200 nm takes up the highest proportion, and has a porosity of 76% by volume.

The composition ratio of raw materials (% by mass), the amount of residual Al after acid treatment (% by mass), and the porosity (% by volume) of Experimental Examples 1 to 7 are summarized in Table 1. The amount of Al is a measurement result obtained by ICP-OES, and the porosity is a value excluding holes between particles. As shown in Table 1, it was found that the amount of residual Al after the acid treatment in Experimental Examples 1 to 7 is 3.2% to 6.2% by mass, and most of Al is eluted by the pore forming treatment which is an acid treatment. While the porosity of Experimental Examples 1 to 5 was 62% to 86% by volume, the porosity of Experimental Example 6 was 33% by volume which is a low porosity.

TABLE 1

| | Composition ratio of raw material (% by mass) | | | Amount of Al remaining after acid treatment | Porosity |
|---|---|---|---|---|---|
| | Si | Al | Cu | % by mass | % by volume |
| Example 1 | 13 | 87 | — | 4.2 | 76 |
| Example 2 | 18 | 82 | — | 3.6 | 68 |
| Example 3 | 27 | 73 | — | 3.2 | 62 |
| Example 4 | 10 | 90 | — | 6.2 | 86 |
| Example 5 | 10 | 87 | 3 | 5.1 | 84 |
| Example 6 | 57 | 43 | — | 3.8 | 33 |
| Example 7 | — | — | — | — | — |

Preparation of Lithium Secondary Battery Using a Non-Aqueous Electrolytic Solution Each of the silicon materials (82% by mass) of Experimental Examples 1 to 7 as a negative electrode active material, 6% by mass of acetylene black having an average particle size of 2 μm as a conductive material, and 12% by mass of polyimide as a binder were weighed, mixed together, mixed with N-methylpyrrolidone, and then stirred, thereby preparing a slurry as a negative electrode mixture. The slurry was then applied to a copper foil having a thickness of 12 μm, dried, and rolled, thereby preparing a negative electrode having a thickness of 50 μm. It was assumed that the rolling might reduce the porosity of the porous silicon material to about 50% by volume while allowing the porous silicon material to maintain the three-dimensional network structure. The prepared negative electrode was punched into circles having a diameter of 16 mm, a porous polyethylene separator was interposed between the negative electrodes, and metallic lithium was stacked thereon as a counter electrode, thereby forming a laminate. Subsequently, an electrolytic solution obtained by adding $LiPF_6$ at a concentration of 1 mol/L to a mixed solvent obtained by mixing together ethylene carbonate (EC)/dimethyl carbonate (DMC)/ethyl methyl carbonate (EMC) at a volume ratio of 3:4:3 was injected into the aforementioned laminate, thereby manufacturing a lithium secondary battery which is a Tomcell-type small battery cell. The obtained lithium secondary battery was repeatedly charged and discharged 10 cycles at a current density of 0.2 C and a battery voltage in a range of 0 V to 1.5 V.

Characteristics of Lithium Secondary Battery Using Non-Aqueous Electrolytic Solution The initial discharge capacity (mAh/g) of Experimental Examples 1 to 7, the discharge capacity (mAh/g) of the same examples after 10 cycles, and the capacity retention rate (%) of the same examples are summarized in Table 2. The capacity retention rate was calculated from Formula $Q_{10}/Q_1 \times 100$ where $Q_1$ represents a discharge capacity in the first cycle and $Q_{10}$ represents the discharge capacity in the tenth cycle. As shown in Table 2, the capacity retention rate in Experimental Example 7 was 26% that is a low rate, which leaded to the assumption that silicon particles having no voids could not absorb the volume change and might cause problems in the electrode. Even in Experimental Example 6 having a porosity of 33% by volume that is a low porosity, the capacity retention rate was less than 70%, which tells that the capacity retention rate is insufficient. On the other hand, the lithium secondary batteries of Experimental Examples 1 to 5 had a capacity retention rate of 84% to 93% that is an excellent value, which tells that the electrodes are stable. In this way, as shown in Experimental Examples 1 to 5, it was revealed that in a case where a porous silicon material having a porosity of 60% by volume or more is compressed and thus the porosity falls into a range of 5% by volume or more and 50% by volume or less, the capacity retention rate can be particularly increased.

TABLE 2

| Non-aqueous electrolytic solution cell | Initial discharge capacity mAh/g | Discharge capacity after 10 cycles mAh/g | Capacity retention rate[1] % |
|---|---|---|---|
| Example 1 | 1980 | 1849 | 93.4 |
| Example 2 | 1845 | 1697 | 92.0 |
| Example 3 | 1725 | 1451 | 84.1 |
| Example 4 | 1824 | 1689 | 92.6 |
| Example 5 | 1849 | 1725 | 93.3 |
| Example 6 | 1876 | 1276 | 68.0 |
| Example 7 | 1937 | 494.8 | 25.5 |

[1]Measured 10 cycles at 0.2 C in range of 0 V to 1.5 V and calculated from $Q_{10}/Q_1 \times 100$ where $Q_1$ represents initial capacity (mAh/g) and $Q_{10}$ represents capacity (mAh/g) in 10th cycle Next, a porous silicon material that was subjected to a heat treatment after the pore forming treatment was examined.

Experimental Example 8

Al lumps (88% by mass) having sides of 10 mm and 12% by mass of Si lumps were weighed, mixed together, and dissolved in an Ar inert atmosphere by a high-frequency heating method, thereby obtaining a molten alloy. The molten alloy was subjected to gas atomization using an Ar inert gas, thereby obtaining AlSi alloy powder having an average particle size of 8 μm (particle forming step). The composition of the atomized powder can be represented by Al-12.4% by mass of Si-0.14% by mass of Fe, and the structure thereof was composed of primary Al and eutectic Si. Next, the obtained alloy powder was added to 3 mol/L hydrochloric acid diluted with pure water, stirred at room temperature of 25° C. for 1 hour, then filtered while being thoroughly washed, and dried in a vacuum drier at 30° C. for 2 hours. (pore forming step). A treatment for eluting the primary Al was performed, thereby obtaining a porous material (porous silicon particles as a precursor). The obtained porous material was subjected to a heat treatment in an Ar atmosphere under the conditions of 1,000° C. and 2 hours (heat treatment step), and the obtained strengthened porous silicon powder was used as a porous silicon material of Experimental Example 8. In the heat treatment step, Al present as a solid solution in eutectic Si forming the skeleton can be diffused and removed to the surface of the porous material, and an oxide contributing to the strengthening of the skeleton can be formed.

Experimental Example 9

A porous silicon material of Experimental Example 9 was prepared in the same manner as in Experimental Example 8 described above, except that the amounts of Al and Si used were changed to 83% by mass and 17% by mass respectively. The composition of the atomized powder can be represented by Al-17.4% by mass of Si-0.12% by mass of Fe, and the structure thereof was composed of primary Al and eutectic Si. An acid treatment and a heat treatment were performed under the same conditions as in Experimental Example 8, thereby obtaining a porous silicon material of Experimental Example 9.

Experimental Example 10

A porous silicon material of Experimental Example 10 was prepared in the same manner as in Experimental Example 8 described above, except that the amounts of Al and Si used were changed to 81% by mass and 19% by mass respectively. The composition of the atomized powder can be represented by Al-19.4% by mass of Si-0.13% by mass of Fe, and the structure thereof was composed of primary Al, eutectic Si, and primary Si. An acid treatment and a heat treatment were performed under the same conditions as in Experimental Example 8, thereby obtaining a porous silicon material of Experimental Example 10.

Experimental Example 11

A porous silicon material of Experimental Example 11 was prepared in the same manner as in Experimental Example 8 described above, except that the amounts of Al and Si used were changed to 74% by mass and 26% by mass respectively. The composition of the atomized powder can be represented by Al-25.5% by mass of Si-0.14% by mass of Fe, and the structure thereof was composed of primary Al, eutectic Si, and primary Si. An acid treatment and a heat treatment were performed under the same conditions as in Experimental Example 8, thereby obtaining a porous silicon material of Experimental Example 11.

Experimental Example 12

Si powder having an average particle size of 5 μm was used as a silicon material of Experimental Example 12.

Measurement of Physical Properties of Porous Silicon Material

The porous silicon powder having undergone the acid treatment was dissolved by HF and $HNO_3$, and the amount of Al in porous silicon was measured by ICP optical emission spectroscopy (ICP-OES, PS3520U VDDIIII manufactured by Hitachi High-Tech Science Corporation.). In addition, elemental analysis was performed by observation with a scanning electron microscope (SEM, S-4300 manufactured by Hitachi High-Tech Science Corporation.) and energy dispersive X-ray analysis (EDAX, S-4300 manufactured by Hitachi High-Tech Science Corporation.). The pore distribution was measured with a mercury porosimeter (POWERMASTER60GT manufactured by Quantachrome Instruments).

Results and Review

Table 3 shows the raw material composition (at %) of Experimental Examples 8 to 12, the porosity (% by volume) of silicon materials after the pore forming treatment (acid treatment) and the heat treatment at 1,000° C., the amount (% by mass) of Al solid solution after the acid treatment (before the heat treatment), the lattice constant $a_{Si}$ (Å) after the acid treatment, and the lattice constant $a_{Si}$ (Å) after the pore forming treatment and the heat treatment. The porosity is represented by a value determined by the mercury intrusion porosimeter. The amount of Al solid solution is represented by a value determined by ICP analysis. As shown in Table 3, the porous silicon materials having undergone the heat treatment in Experimental Examples 8 to 11 have a porosity or of 50% by volume or more and may have a porosity of 60% by volume or more, which tells that porous silicon materials could be formed. It was assumed that the amount of residual Al in the porous silicon materials may be in a range of 3% to 5% by mass. As for the lattice constant $a_{Si}$ of Si having undergone the acid treatment and not yet being subjected to the heat treatment, while Si in Experimental Example 12 has $a_{Si}$ of 5.430 (Å), Si in Experimental Examples 8 to 11 has $a_{Si}$ of 5.440 (Å) or more, which tells that Al is present as a solid solution in Si. As for the lattice constant $a_{Si}$ of Si having undergone the acid treatment and the heat treatment, Si in Experimental Examples 8 to 11 has $a_{Si}$ of 5.435 (Å) or less which is the same as $a_{Si}$ of Si in Experimental Example 12. From the result, it was assumed that in Experimental Examples 8 to 11, by the heat treatment at 1,000° C., Al present as a solid solution in Si might diffuse to the surface side, which might lead to the transition to a silicon skeleton in which no Al solid solution is present.

1,000° C., the porous silicon material had a pore distribution of several tens of nanometers to 11 μm where the peak of pore size was 200 nm.

Figure 8:
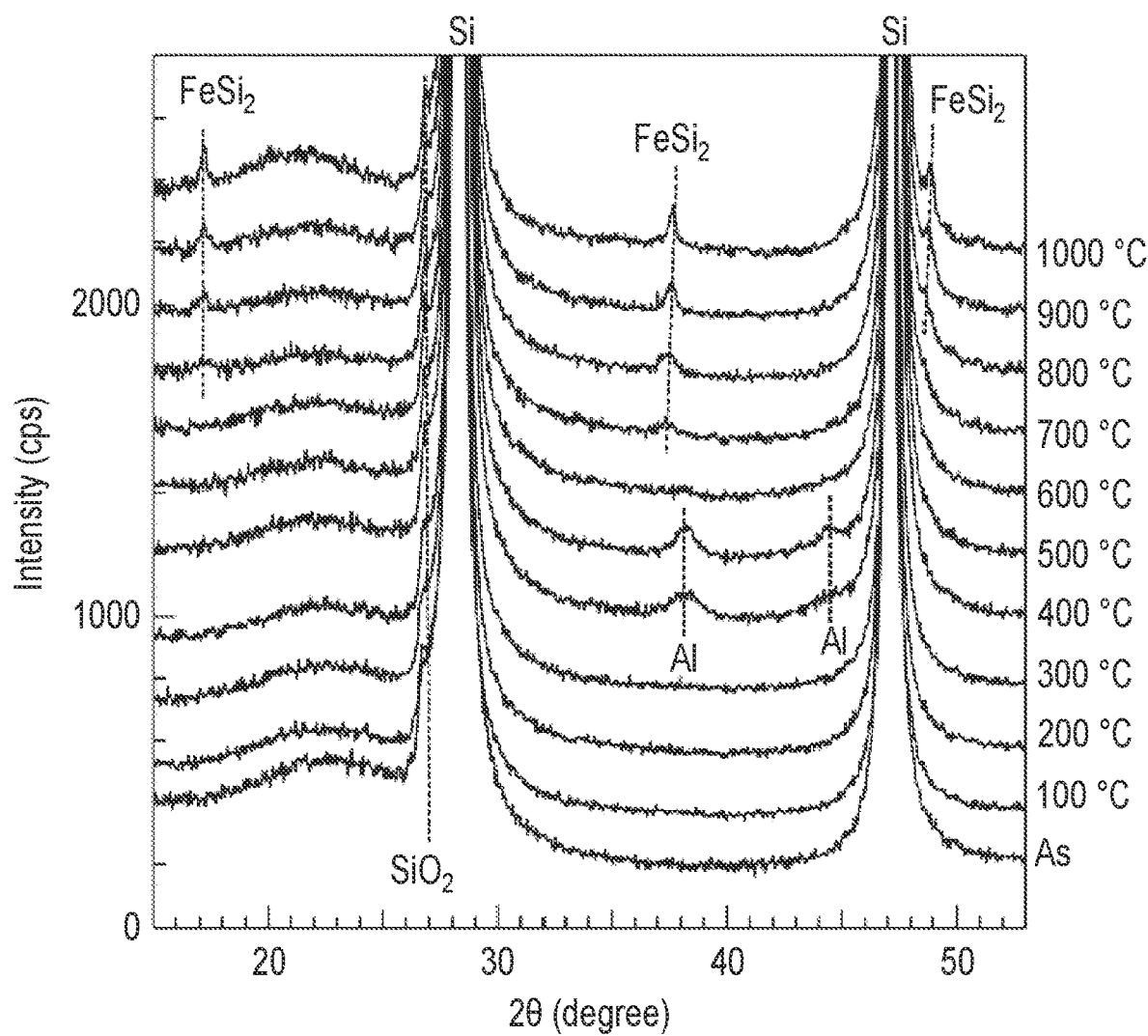
FIG. 8 is a diagram showing the relationship between heat treatment temperatures and XRD profiles in Experimental Example 8.
Figure 9:
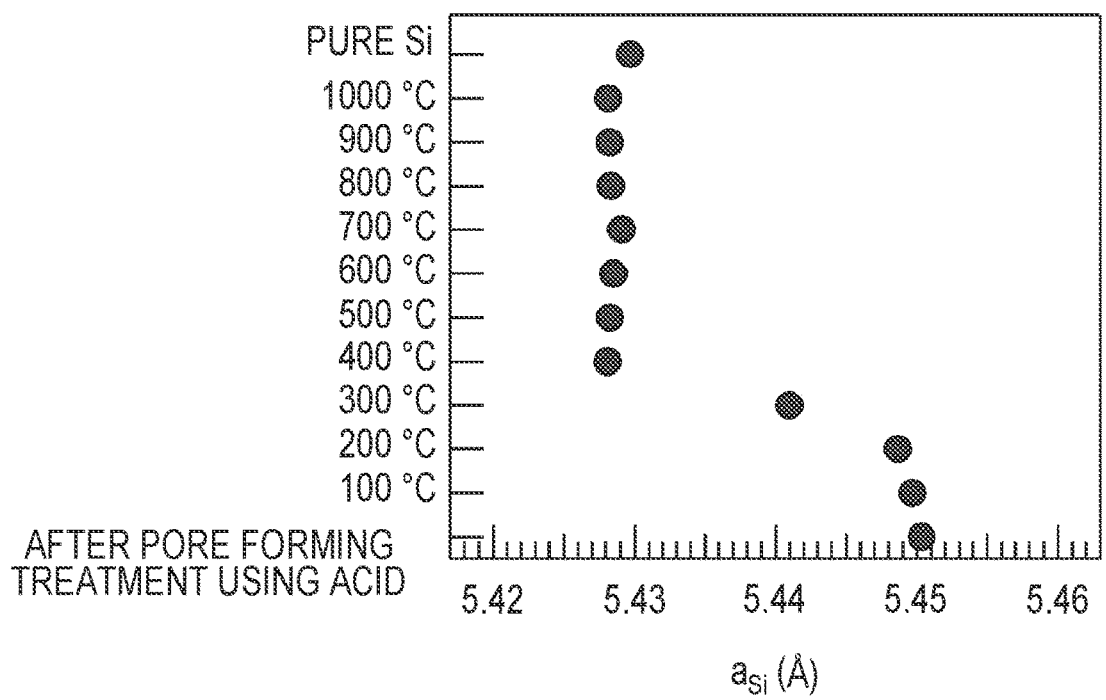
FIG. 9 is a diagram showing the relationship between heat treatment temperatures and a lattice constant $a_{Si}$ in Experimental Example 8.

Next, the change in crystal structure of the porous silicon material caused by the heat treatment temperature was investigated by X-ray diffraction. As a heat treatment, raw materials having the composition of Experimental Example 8 were heated from 100° C. to 1,000° C. by 100° C. in an Ar atmosphere, and the obtained porous silicon material was analyzed by XRD. FIG. 8 is a diagram showing the relationship between heat treatment temperatures and XRD profiles in Experimental Example 8. From the measurement result of the XRD profiles, the lattice constant $a_{Si}$ of Si was calculated by Rietveld analysis. FIG. 9 is a diagram showing the relationship between heat treatment temperatures and a lattice constant $a_{Si}$ in Experimental Example 8. From the X-ray diffraction pattern shown in FIG. 8, a broad peak derived from amorphous phase was observed at around 2θ=20° to 25°. The amorphous phase is derived from $SiO_2$. $SiO_2$ is present in the porous silicon material before the heat treatment. $SiO_2$ has approximately doubled in terms of molar ratio after the heat treatment at a temperature of 600° C. or higher. A peak of Al was detected in a temperature range of the heat treatment temperature of 400° C. to 500° C. In the atomized powder, the content of Fe impurities was about 0.1% by mass. Therefore, at a temperature of 700° C. or higher, a peak of $FeSi_2$ was detected, which tells that $FeSi_2$ was generated. As shown in FIG. 9, from the change in the lattice constant $a_{Si}$ of Si caused by the heat treatment temperature, it was assumed that the lattice constant $a_{Si}$ of Si not yet being subjected to the heat treatment might have a larger lattice constant $a_{Si}$ compared to a pure Si standard sample and might contain Al as a solid solution. By the heat treatment, the lattice constant began to decrease at 300° C., and became substantially equal to the lattice constant of pure Si at 400° C. From the result, it was assumed that Al present

TABLE 3

| | Raw material Elemental composition (at %) | | | Silicon material | | | |
|---|---|---|---|---|---|---|---|
| | | | | Porosity after acid treatment at 1,000° C. and heat treatment[1] | Amount of solid solution Al after acid treatment[2] | Lattice constant measured before heat treatment after acid treatment is performed | Lattice constant after acid treatment and heat treatment at 1,000° C. |
| | Si | Al | Fe | % by volume | % by mass | Å | Å |
| Example 8 | 12.4 | Bal. | 0.15 | 76 | 4.1 | 5.450 | 5.428 |
| Example 9 | 17.4 | Bal. | 0.12 | 69 | 3.9 | 5.448 | 5.427 |
| Example 10 | 19.4 | Bal. | 0.13 | 66 | 3.6 | 5.447 | 5.431 |
| Example 11 | 25.5 | Bal. | 0.14 | 65 | 3.4 | 5.445 | 5.432 |
| Example 12 | Bal. | — | — | — | — | 5.430 | 5.430 |

Figure 6:
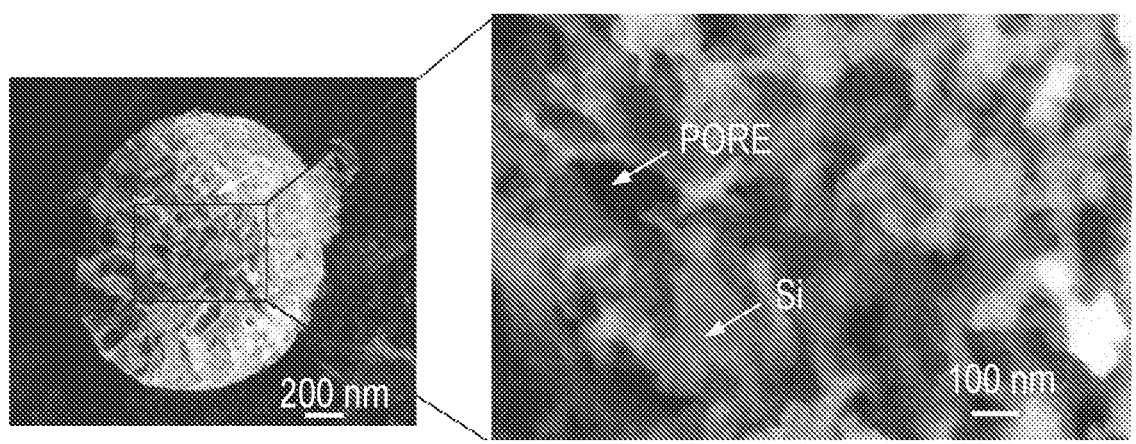
FIG. 6 is an SEM image of the porous silicon material of Experimental Example 8.
Figure 7:
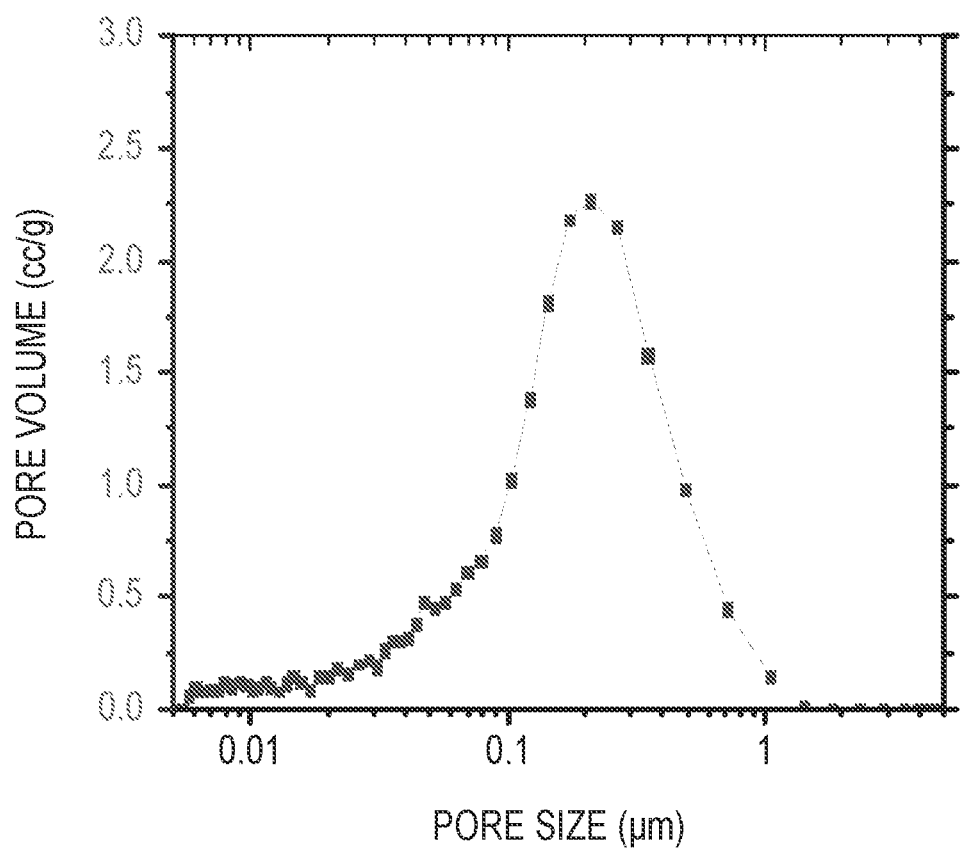
FIG. 7 is a pore distribution curve of the porous silicon material of Experimental Example 8.

[1]Measurement result obtained by mercury intrusion porosimeter
[2]Determination result of ICP analysis FIG. 6 is an SEM image of the porous silicon material of Experimental Example 8. FIG. 6 is an SEM image of a porous silicon material obtained by performing a heat treatment at 1,000° C. on a porous material in an Ar atmosphere, the porous material being obtained by treating Al-12.6% by mass of Si atomized powder with a 3 mol/L hydrochloric acid solution for eluting Al. As shown in FIG. 6, by the elution of primary Al in the silicon compound with an acid, pores were formed, and porous silicon particles were obtained. FIG. 7 is a pore distribution curve of the porous silicon material of Experimental Example 8. As shown in FIG. 7, after being subjected to the heating treatment at as a solid solution in the porous material might be precipitated at a temperature of 400° C. or higher, Al present as a solid solution in Si might diffuse to the surface thereof and be removed from the inside of the silicon skeleton.

Figure 10:
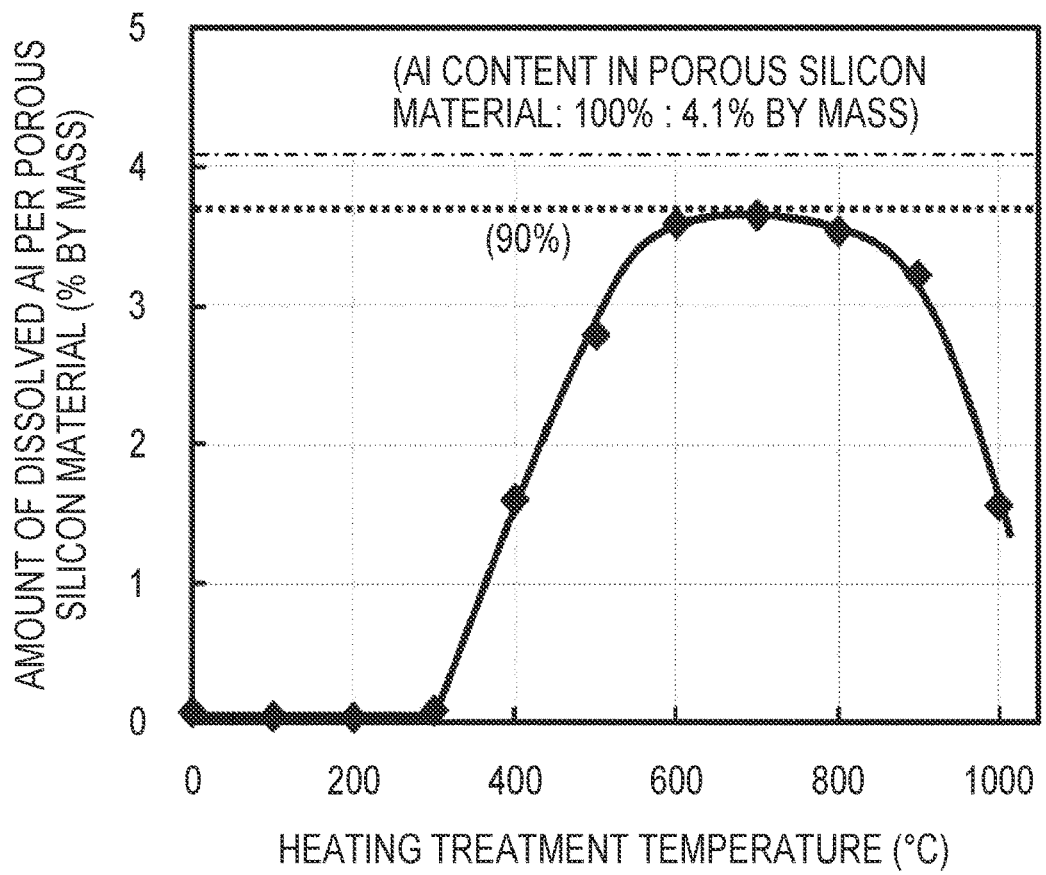
FIG. 10 is a diagram showing the relationship between heat treatment temperatures and amounts of Al dissolved (% by mass) in Experimental Example 8.

Next, the amount of Al present on the surface of the porous silicon material having undergone a heat treatment in a temperature range of 100° C. to 1,000° C. was measured. In this way, whether the amount of Al solid solution in the silicon skeleton in the porous silicon material is reduced after the heat treatment was investigated. FIG. 10 is a diagram showing the relationship between heat treatment temperatures and amounts of Al dissolved (% by mass) in Experimental Example 8. The amount of Al present on the surface was measured as follows. First, the porous material having the composition of Experimental Example 8 was subjected to a heat treatment at each temperature, and 10 mL of 6 mol/L nitric acid and 5 mL of 50% by volume hydrofluoric acid were added to each of the obtained porous silicon materials and dissolved by heating. Then, 10 mL of 8 mol/L sulfuric acid was added thereto, the mixture was further heated to generate white smoke of sulfuric acid, and then the mixture was diluted to 100 mL. In the acid treatment for ICP analysis, Si, $Al_2O_3$, and the like are not dissolved, and Al metal is dissolved. By using the solution, the amount of Al was quantified by an inductively coupled plasma emission spectrophotometer. In FIG. 10, the ordinate shows the amount of Al dissolved (% by mass) with respect to the total amount of the porous silicon material including Si and Al, the dashed line shows the amount of Al as a solid solution (4.1% by mass) in the porous silicon material not yet being subjected to the heat treatment, and the dotted line is a line corresponding to 90% by mass (3.7% by mass) of the amount represented by the dashed line. Al present as a solid solution in the porous silicon material began to be precipitated on the surface of the silicon skeleton by the heat treatment at a temperature of 400° C. or higher, then kept increasing until the temperature reached 700° C., and decreased again when the temperature was 800° C. or higher. It was revealed that in a case where the heat treatment is performed in an Ar atmosphere in a range of 400° C. to 800° C., Al present as a solid solution in the silicon skeleton is removed from the inside of the silicon skeleton and diffuses to the surface of the silicon skeleton, and particularly in a range of 600° C. to 800° C., Al as a solid solution can be reduced by about 90%. It is expected that at a temperature of 800° C. or higher, even in an Ar atmosphere, the Al metal may be oxidized, and Al oxide may be formed on the surface of the silicon skeleton. It was assumed that accordingly, the Al metal might not be dissolved by the acid treatment for ICP analysis, and the amount of Al dissolved might be reduced.

Figure 11A:
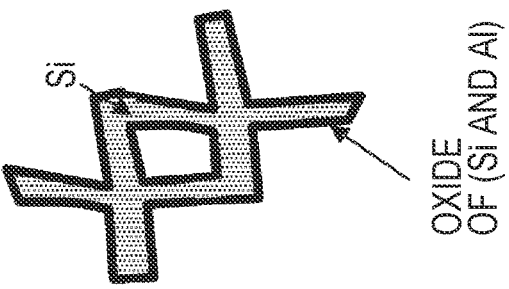
FIG. 11A is a view illustrating how the state of a porous silicon material changes by a treatment.
Figure 11B:
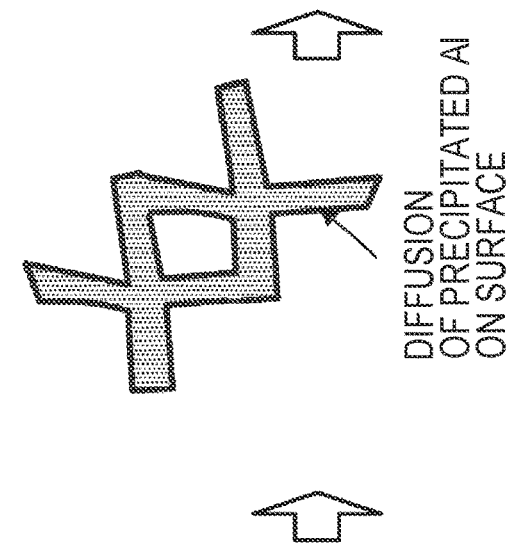
FIG. 11B is a view illustrating how the state of a porous silicon material changes by a treatment.
Figure 11C:
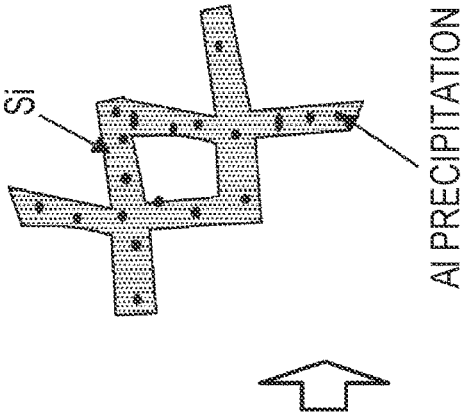
FIG. 11C is a view illustrating how the state of a porous silicon material changes by a treatment.
Figure 11D:
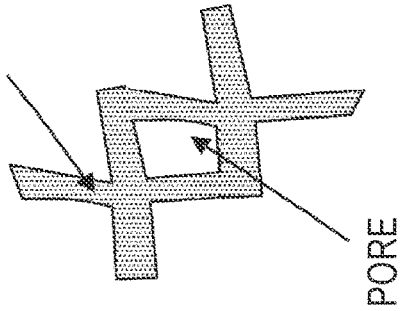
FIG. 11D is a view illustrating how the state of a porous silicon material changes by a treatment.

From the result, it was revealed that performing a heat treatment at a temperature of 600° C. to 800° C. and then performing an acid treatment on the porous silicon material makes it possible to reduce the amount of Al in Si while maintaining the microstructure that can suppress volume expansion. To sum up the results of the crystal structure change investigated by X-ray diffraction, it was assumed that the state of Al in the porous silicon material might change as shown in FIGS. 11A to 11D due to the heat treatment. FIGS. 11A to 11D are views illustrating how the state of the porous silicon material changes by each treatment. In a case where an acid treatment is performed on the AlSi alloy powder obtained by the atomization treatment, solely the primary Al is eluted, and the residual eutectic Si forms a skeleton and turns into a porous material (Si) (FIG. 11A). In a quenching atomization treatment, Al contained in the eutectic Si is in a state of solid solution. In a case where Al present as a solid solution in Si is subjected to a heating treatment at a temperature of 300° C. or higher, phase separation of Al from the solid solution occurs, and Al is precipitated (FIG. 11B). At a heating temperature of 600° C. or higher, the precipitated Al diffuses to the surface (FIG. 11C). It was found that in a heating temperature range of 600° C. to 800° C., performing the acid treatment after the heating treatment makes it possible to reduce the Al contained in Si by about 90%. It is considered that at a heating temperature of 900° C. or higher, Al having diffused on the surface may be oxidized together with Si, turn into an (Si, Al) oxide, and remain on the surface even after the acid treatment (FIG. 11D). The (Si, Al) oxide is considered to be electrochemically inert, and assumed to have a function of strengthening the silicon skeleton by covering the surface of the active material.

Preparation of Power Storage Device

Next, the charge and discharge characteristics of the power storage device using the silicon materials of Experimental Examples 8 to 12 as a negative electrode active material were examined. Each of the negative electrode active materials (60% by mass) of Examples 8 to 12, 20% by mass of acetylene black having an average particle size of 2 μm as a conductive material, and 20% by mass of polyimide as a binder were mixed together, N-methylpyrrolidone (NMP) as a solvent was added thereto, and the mixture was stirred, thereby preparing a slurry. The slurry was then applied to a copper foil having a thickness of 20 μm, then dried, and rolled, thereby preparing a negative electrode having a thickness of 50 μm. It was assumed that the rolling might reduce the porosity of the porous silicon material to about 50% by volume while allowing the porous silicon material to maintain the three-dimensional network structure. The prepared negative electrode was punched into circles having a diameter of 16 mm, a porous polyethylene separator was interposed between the negative electrodes, metallic lithium was stacked thereon as a counter electrode, and an electrolytic solution was injected into the laminate, thereby preparing a Tomcell-type small lithium secondary battery as a test cell. The electrolytic solution used was prepared by adding $LiPF_6$ at a concentration of 1 mol/L to a mixed solvent obtained by mixing together fluoroethylene carbonate/ethylene carbonate/dimethyl carbonate/ethyl methyl carbonate (FEC/EC/DMC/EMC) at a volume ratio of 1.5:3:4:3. The obtained test cell was repeatedly charged and discharged 50 cycles at a current density of 0.1 C and a battery voltage in a range of 0.005 V to 1.5 V.

Results of Evaluation on Test Cell Characteristics

Table 4 shows the initial discharge capacity (mAh/g), the discharge capacity after 50 cycles (mAh/g), and the capacity retention rate (%) obtained from the discharge capacity after 50 cycles with respect to the initial discharge capacity. As shown in Table 4, by the examination on the initial discharge capacity, it was revealed that the test cells of Experimental Examples 8 to 11, in which the heat treatment was performed at 1,000° C. in an inert atmosphere after the pore forming treatment, exhibit a discharge capacity of 2,500 mAh/g or more which is a higher discharge capacity. Regarding the durability of the battery, in Experimental Example 12, the capacity retention rate for 50 cycles was 6% which is an extremely low rate. However, in the test cells using the porous silicon materials of Experimental Examples 8 to 11 as a negative electrode active material, the capacity retention rate was 84% to 97% which is an excellent result. Therefore, it was found that making the alloy into a porous material and performing a heat treatment makes it possible to further increase the capacity and the cycle capacity retention rate. It was assumed that by the heat treatment, Al present as a solid solution in the silicon skeleton may be removed as shown in FIG. 12, and the purer Si skeleton may further improve the capacity. It was assumed that the formation of the Al oxide on the surface of the silicon skeleton may further strengthen the silicon skeleton, which may lead to further improvement of durability, such as volume change by the charge and discharge cycles.

TABLE 4

| Non-aqueous electrolytic solution cell | Initial discharge capacity mAh/g | Discharge capacity after 50 cycles mAh/g | Capacity retention rate for 50 cycles[1] % |
|---|---|---|---|
| Example 8 | 2824 | 2457 | 87.1 |
| Example 9 | 2705 | 2293 | 84.8 |
| Example 10 | 2716 | 2349 | 86.5 |
| Example 11 | 3011 | 2517 | 83.6 |
| Example 12 | 2804 | 165 | 5.9 |

[1])Measured 50 cycles at 0.1 C in range of 0.005 V to 1.5 V and calculated from $Q_{50}/Q_1$ × 100 where $Q_1$ represents initial capacity (mAh/g) and $Q_{50}$ represents capacity (mAh/g) in 50th cycle Note that the present disclosure is not limited to the experimental examples described above. It goes without saying that the present disclosure can be embodied in various aspects as long as the aspects are within the technical scope of the present disclosure.

The present disclosure is applicable to the technical field of secondary batteries.

What is claimed is:

1. A manufacturing method of a porous silicon material, comprising:
    a particle forming step of making a silicon alloy that contains Al as a first element in an amount of 50% by mass or more and Si in an amount of 50% by mass or less into particles;
    a pore forming step of removing the first element from the silicon alloy to obtain a porous material; and
    a heat treatment step of heating the porous material to diffuse elements other than Si to a surface of the porous material.

2. The manufacturing method of a porous silicon material according to claim 1, wherein in the heat treatment step, the porous material is heated at a temperature in a range of 400° C. or higher and 1,100° C. or lower.

3. The manufacturing method of a porous silicon material according to claim 1, wherein in the heat treatment step, the first element diffused to the surface is oxidized, and the surface is coated with an oxide containing the first element.

4. The manufacturing method of a porous silicon material according to claim 1, wherein in the heat treatment step, the porous material is heated in an inert atmosphere in a range of 600° C. or higher or heated in the presence of oxygen in a range of 400° C. or higher.

5. The manufacturing method of a porous silicon material according to claim 1, wherein in the pore forming step, the first element is selectively removed by an acid or an alkali.

6. The manufacturing method of a porous silicon material according to claim 1, wherein in the pore forming step, an amount of substances other than Si to be removed is in a range of 85% by mass or more and 100% by mass or less.

7. The manufacturing method of a porous silicon material according to claim 1, wherein in the pore forming step, the obtained porous silicon material has an average porosity in a range of 50% by volume or more and 95% by volume or less.

* * * * *